Figure 1:
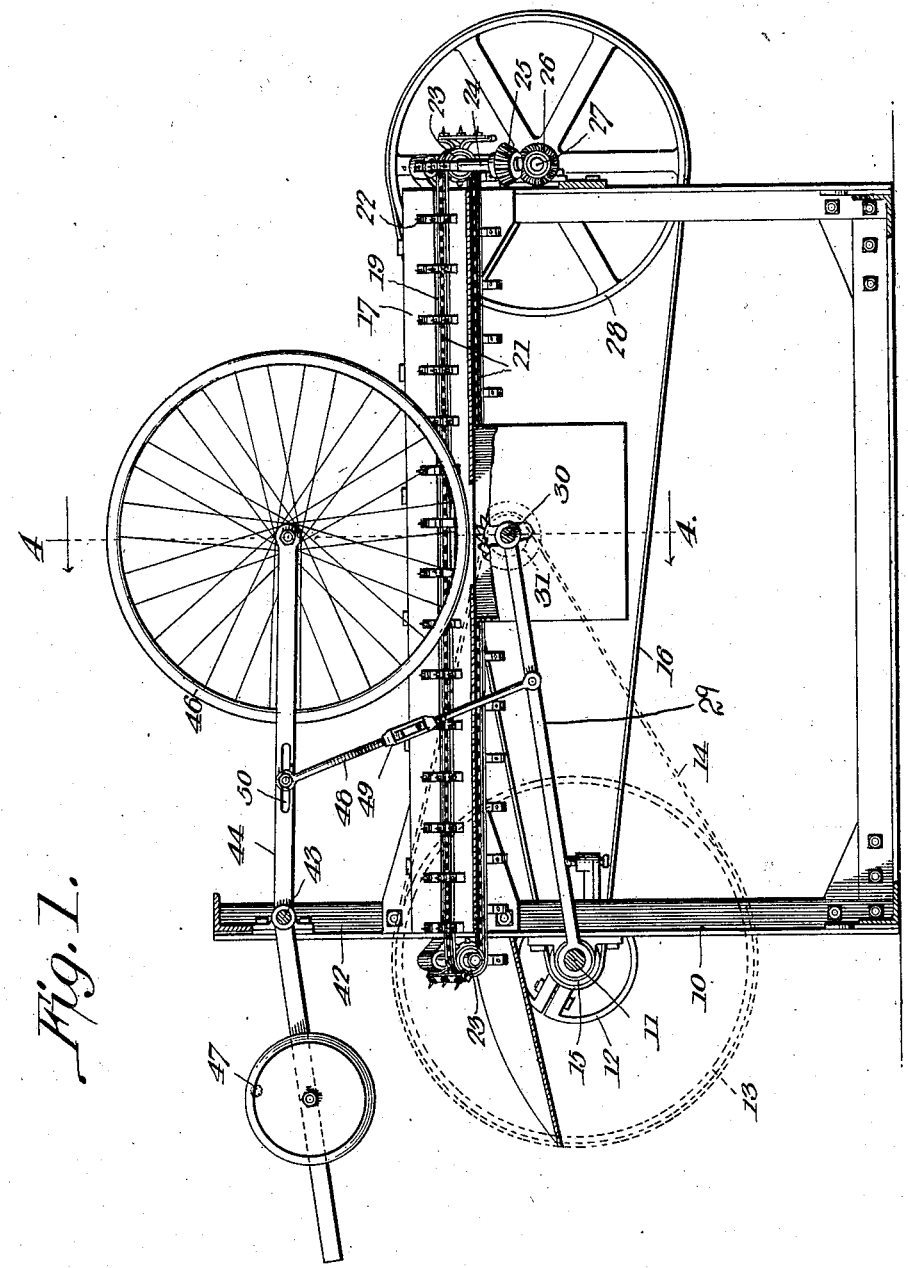

No. 833,709. PATENTED OCT. 16, 1906.
M. J. ELY.
BEET SAMPLING MACHINE.
APPLICATION FILED DEC. 13, 1904.

4 SHEETS—SHEET 1.

Witnesses
E. J. Stewart
Jno. E. Parker

Martin J. Ely.
Inventor.
by C. A. Snow & Co,
Attorneys

No. 833,709. PATENTED OCT. 16, 1906.
M. J. ELY.
BEET SAMPLING MACHINE.
APPLICATION FILED DEC. 13, 1904.

4 SHEETS—SHEET 2.

Witnesses:

Martin J. Ely, Inventor by

Attorneys

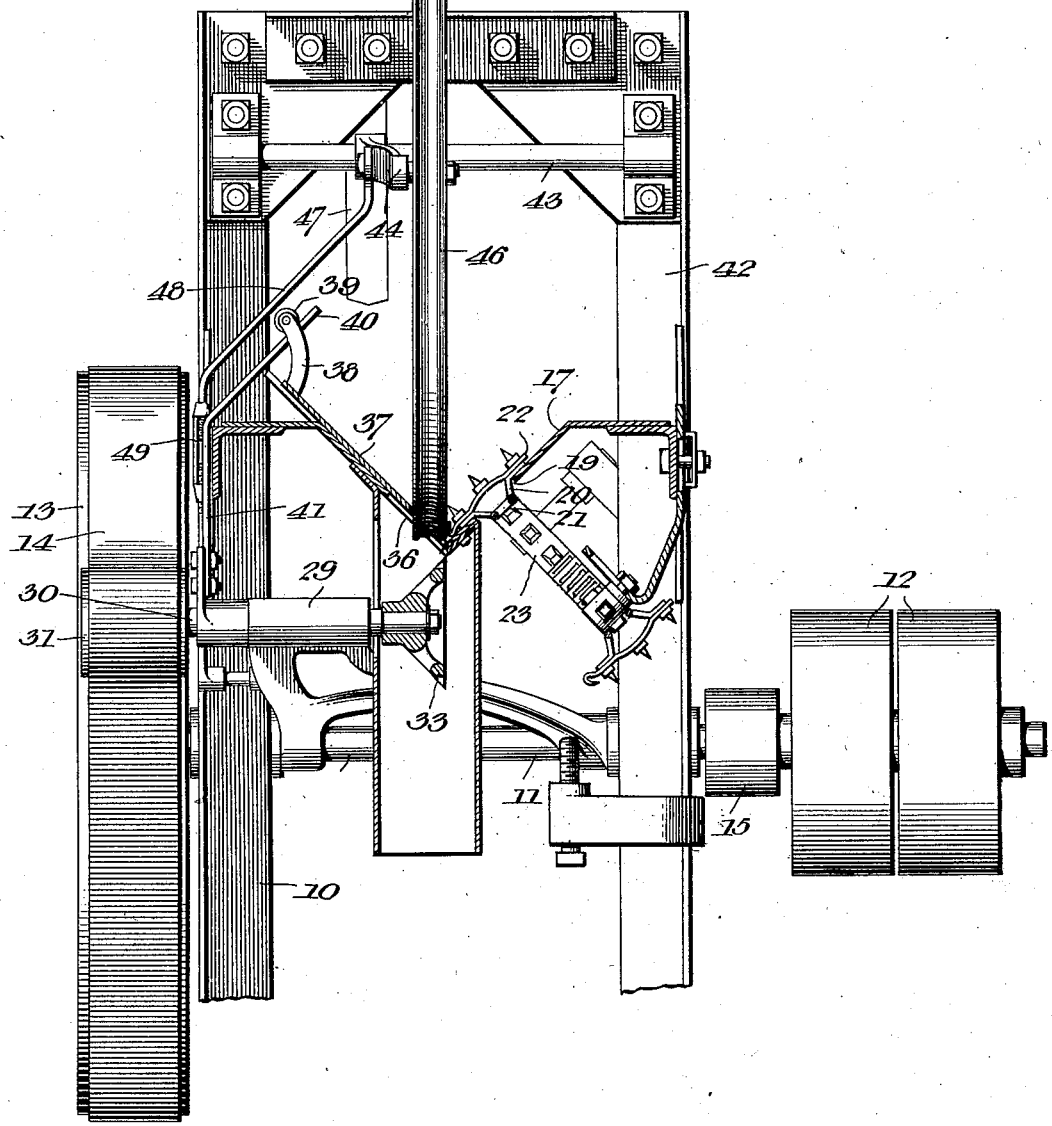

No. 833,709. PATENTED OCT. 16, 1906.
M. J. ELY.
BEET SAMPLING MACHINE.
APPLICATION FILED DEC. 13, 1904.

4 SHEETS—SHEET 4.

Witnesses

Martin J. Ely, Inventor.
by C. A. Snow & Co.,
Attorneys

UNITED STATES PATENT OFFICE.

MARTIN J. ELY, OF OXNARD, CALIFORNIA, ASSIGNOR OF ONE-HALF TO JAMES A. DRIFFILL, OF OXNARD, CALIFORNIA.

BEET-SAMPLING MACHINE.

No. 833,709.        Specification of Letters Patent.        Patented Oct. 16, 1906.

Application filed December 13, 1904. Serial No. 236,743.

*To all whom it may concern:*

Be it known that I, MARTIN J. ELY, a citizen of the United States, residing at Oxnard, in the county of Ventura and State of California, have invented a new and useful Beet-Sampling Machine, of which the following is a specification.

In the manufacture of beet-sugar the value of the beets purchased at the factory is usually determined by taking a sample of the beets and testing the same for the purpose of ascertaining the percentage of sugar.

From each wagon-load a quantity of beets, usually about fifty pounds, is taken at random and accurately weighed. After this the beets are washed, topped, and trimmed and again weighed to determine the percentage of tare. A small quantity is then rasped from each beet, and the pulp thus obtained is placed in a hydraulic press for the purpose of extracting the juice. The juice is then tested to determine the percentage of sugar and the value of the wagon-load to be purchased. These tests are not accurate, owing principally to the fact that the quantity of sugar differs at different points in the beet. A true sample would be in the form of a segment extending from the heart to the skin of the beet; but it is practically impossible to accomplish this by hand, and as a rule only a portion of the beet nearest the skin is utilized for the sample. It is impracticable to employ the whole of the quantity taken from the wagon, inasmuch as the quantity of juice would render the test a matter of considerable difficulty and it would be too costly to waste fifty pounds, more or less, of each wagon-load.

The principal object of the present invention is to provide a machine that will automatically remove from the beets an accurate sample, the portion removed extending from the heart or center of the beet to the outer skin and leaving an opening in the form of a segment, which may be of any size, the machine in the present case removing one-eighth, or forty-five degrees, of the beet; but this may be altered by providing a rasp of different size.

A further object of the invention is to provide a machine in which the position of the rasp will be automatically adjusted in accordance with the size of the beet, thus rendering it unnecessary to grade the beets before placing them into the machine.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 3:
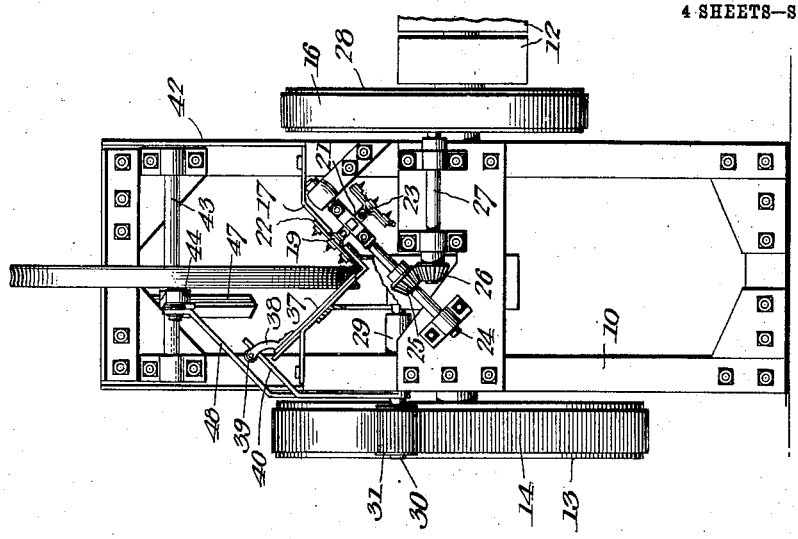
Figure 2:
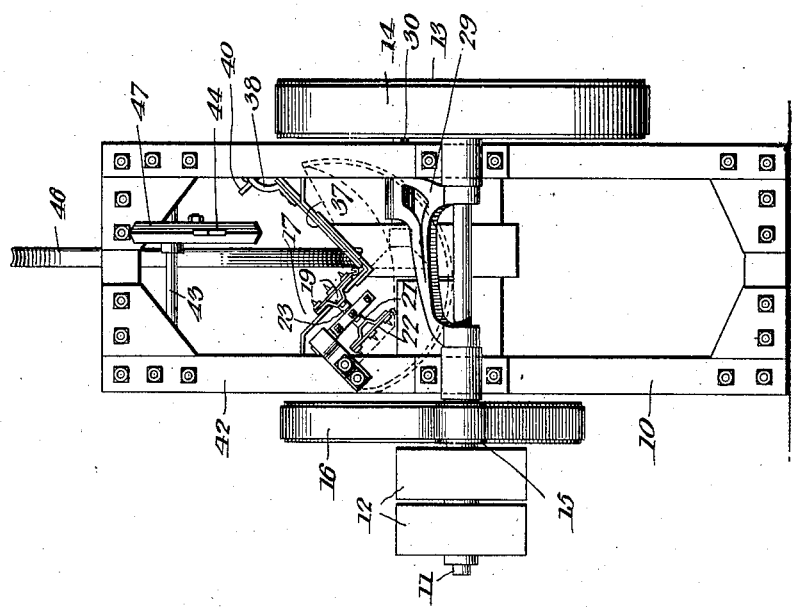
Figure 5:
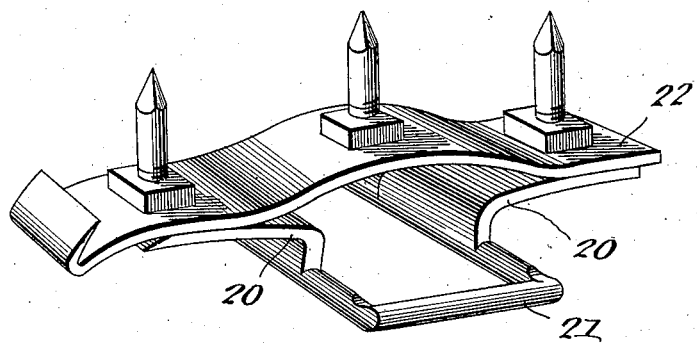
Figure 6:
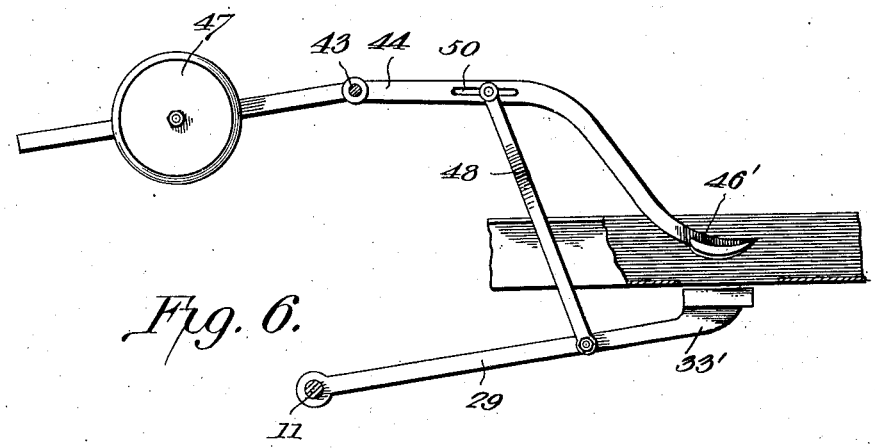
Figure 7:
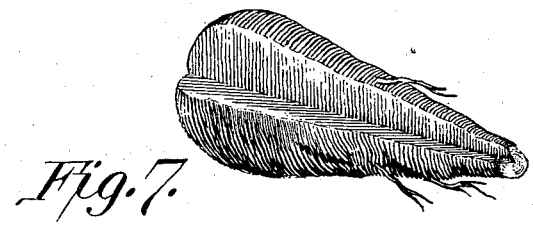

In the accompanying drawings, Figure 1 is a longitudinal sectional elevation of a beet-sampling machine constructed in accordance with the invention. Fig. 2 is an end elevation of the same looking from the left of Fig. 1. Fig. 3 is a similar view looking from the opposite end. Fig. 4 is a transverse sectional elevation of a portion of the machine on the line 4 4 of Fig. 1, the view being on an enlarged scale. Fig. 5 is a detail perspective view of one of the beet-engaging bars of the conveying mechanism. Fig. 6 illustrates a modification of the invention. Fig. 7 is a detail perspective view of a beet from which a sample has been removed.

Similar numerals of reference are employed to indicate corresponding parts throughout the several figures of the drawings.

The working parts of the machine are mounted on a suitable frame 10, preferably formed of structural iron, the frame being of any required dimensions and provided with bearings for the support of a main shaft 11, having fast and loose pulleys 12, over which extends a suitable driving-belt. This shaft is further provided with a large belt-wheel 13, over which a belt 14 for driving the rasp passes, and a small pulley 15, over which passes a belt 16 for driving the beet-conveyer mechanism.

At the top of the machine is a V-shaped conveyer and product-holder trough 17, formed, preferably, of two sheets of metal disposed in angular relation, one of the sheets having a longitudinal slot 19 for the passage of the extended ears 20 of a link belt 21, and to these ears are fastened toothed cross-bars 22 for engaging the beets and moving the same along the trough. The link belts pass over sprocket-wheels 23, arranged on shafts at the opposite ends of the machine. One of these shafts 24 is provided with a bevel-gear 25, intermeshing with bevel-gear 26, that is mounted on a shaft 27. This shaft carries a large belt-wheel 28, over which passes the power-transmitting belt 16.

On the shaft 11 is pivoted an arm 29, that is provided at its outer end with bearings for the reception of a shaft 30, and on the shaft is a small pulley 31, over which passes the power-transmitting belt 14, said shaft being revolved at high speed, usually about sixteen hundred revolutions per minute. The shaft 31 further carries a rasp 33. The rasp is frusto-conical in form and is provided on both its base and inclined face with teeth which shred or grind away the pulp of the beets. In the present instance the two active faces of the rasp are arranged at an angle of forty-five degrees to each other, and the rasp is designed to cut away a segment of the beet equal to one-eighth of the whole beet, the segment extending from the outer skin to the heart-line of the beet and extending in a straight axial line from the crown to the tip of the root. A rasp of different size may be employed to remove a segment of a greater or less size, as will be readily understood; but in all cases the same proportion is removed from each beet, no matter what the size of the latter may be.

When in normal operative position, the extreme edge at the angle of the two faces of the rasp rests in a line with the bottom of the trough, and during the operation of the device the rasp moves up and down in accordance with the size of the beet, an opening 36 being formed in one side of the trough for this purpose. The opening is normally closed by a slidable door 37, to the upper end of which is secured a pair of brackets 38, carrying an antifriction-roller 39, slightly spaced from the top of the door. Under this roller passes an arm 40, disposed at an angle to the adjacent side of the trough. The two sides of the trough are generally disposed at angles of forty-five degrees from the vertical, and the upper end of the bar 40 is so arranged as to extend at a right angle to the plane of the adjacent side of the trough. The bar 40 is provided with a vertical portion 41, which is connected to the pivoted rasp-supporting arm 29, and as the latter rises and falls the door will be opened and closed.

At one end of the frame is a pair of vertical standards 42, forming supports for a cross-bar 43, to which is pivoted a lever 44. One end of the lever extends out over the trough and carries a gage, which in the present embodiment of the invention is illustrated in the form of a wheel 46. The axes of the gage-wheel and the rasp-wheel are preferably in the same vertical plane. The opposite end of the lever 44 carries an adjustable counter-weight 47, by which the downward pressure of the gage may be determined. The two levers 29 and 44 are connected by a link 48, preferably made in two sections united by a turnbuckle 49 to permit adjustment, and the upper lever 44 is slotted, as indicated at 50, for the passage of the upper connecting-pin, in order to permit adjustment of the point of connection.

In the operation of the machine the driving-belt is shifted to the fast pulley and the machine started. The beets are then dumped into the trough and are fed singly under the gage-wheel. The gage is raised to an extent determined by the diameter of the beet, and the upward movement on the lever 44 is transmitted through the link 48 to the lever 49, causing a corresponding upward movement of the rasp-wheel. The extent of movement of the latter, however, is only one-half that of the gage, owing to the point of connection of the two levers. For instance, if the beet is four inches in diameter the gage-wheel will be raised four inches and the rasp-wheel will be raised two inches, so that its point or edge at the juncture of the two operating-faces will cut directly to the heart-line of the beet, but no farther. The diameter of the beet being cut will of course vary from the crown to the tip of the root, and as it varies the height of the gage-wheel will be varied and the distance which the rasp-wheel is elevated will also be varied; but in all cases the movement of the latter will be exactly one-half the movement of the gage.

The result of the operation is clearly illustrated in Fig. 7, which shows that a segment of forty-five degrees has been removed from the beet, the cut being from the outer skin to the heart and in a direct axial line from the crown to the tip of the root. It is obvious that the depth of cut may vary in beets of different sizes; but in every case the cut will be from the circumference to the exact center, irrespective of the diameter of the beet.

It is evident that from each beet there is removed exactly one-eighth of its bulk, no matter what that bulk may be, and thus an absolutely-correct sample is taken for subsequent analysis.

While the gage element illustrated and described is in the form of a wheel and the cutting element in the form of a rasp-wheel, it is obvious that these may be changed without departing from the invention. For instance, as shown in Fig. 6, the gage element may be in the form of a simple finger 46' and the cutting element in the form of a V-shaped knife 33'.

Having thus described the invention, what is claimed is—

1. A sampling-machine for the removal of a true segment from a natural product, said machine comprising a connected gage and cutter that are disposed at diametrically opposite points with respect to the product, and are movable toward and from each other, the gage element engaging the surface of the article and serving to maintain the edge of the cutting element in the axial line of the product.

2. A sampling-machine for the removal of a true segment from a natural product, said machine comprising a conveying means for moving said product in the direction of its length, and a connected gage and cutter that are disposed at diametrically opposite points with respect to the product, and approximately in a plane at a right angle to the axial line thereof, the gage element engaging the surface of the article and serving to maintain the edge of the cutting element in the axial line of the product.

3. In a sampling-machine for natural products, a holder, feeding means, and means, controlled by the product operated upon, for automatically cutting from the product a sample and for progressively varying the depth of cut in accordance with the variations in the size of the product.

4. In a sampling-machine for natural products, a holder, feeding means, a cutting element arranged to cut axially from the product a sample-sector, and a gage engaged by the product and movable synchronously with the cutting element.

5. In a sampling-machine of the class described, a conveyer, a cutter arranged at one side thereof, a gage arranged at the opposite side of the conveyer, and operative connections between the cutter and gage to effect synchronous action of the same.

6. A sampling-machine for the removal of a true segment from a natural product, said machine comprising a conveyer-trough, a feeder operating through said trough, a cutter operating beneath and through the trough and maintained with its edge constantly in the axial line of the product, a gage arranged in the vertical plane of the cutter, and coupling connections between the cutter and the gage to insure synchronous movement and proportional adjustment of the cutter.

7. In a sampling-machine of the class described, a conveyer-trough provided with an opening therein, a closure for said opening, a cutter arranged to operate through the opening of the trough, a gage operatively connected with the cutter to adjust the position thereof, feeding means, and means, controlled by the position of the cutter, for automatically adjusting the position of said closure.

8. In combination, a trough having a bottom opening, a cutter movable through said opening, a gage disposed opposite the cutter, means for moving objects to be cut between the gage and cutter, pivotally-mounted levers carrying the gage and cutter, and means connecting said levers.

9. In combination, a trough having a bottom opening, a cutter movable through the opening, a pivotally-mounted arm carrying said cutter, means for traversing objects past the cutter, a revoluble gage actuated by the objects and disposed opposite the cutter, a pivoted lever carrying said gage, means for connecting the two levers and an automatically-adjusted closure for said bottom opening.

10. In combination, a trough having an opening, a cutter movable therethrough, a pivoted lever carrying the cutter, a revoluble gage, means for traversing objects along the trough between the cutter and gage, a pivoted lever carrying the gage, and an adjustable link connecting the two levers.

11. In combination, a trough having an opening, a cutter movable therethrough, a pivoted lever carrying the cutter, a gate for closing the opening, a gate-opening means connected to said lever, means for traversing objects along the trough, a gage actuated by the objects, a lever carrying the gage, and means for connecting the two levers.

12. In combination, a frusto-conical rasp, a movable support therefor, means for revolving the rasp, means for traversing objects to be actuated past the rasp, and a gage operated by said objects and connected to the support, said gage and rasp being so related as to cause the latter to cut samples of the same proportion from objects of different sizes.

13. The combination with a frame, of a trough supported thereby and provided with an open bottom, a shaft, means for revolving the shaft, a lever fulcrumed on said shaft and provided at its free end with a bearing, a rasp-supporting shaft mounted on the bearing, a rasp, and a pulley on the shaft, a belt-wheel arranged on the main shaft and having a belting connection with the pulley, a second pivotally-mounted lever, a gage-wheel supported thereby, and actuated by the objects to be cut, and an adjustable link connecting the two levers.

14. The combination with a frame, of a trough having an open bottom, a slidable gate for closing the opening, antifriction-rollers supported by the gate, a main shaft having a belt-wheel and pulley, a lever fulcrumed on the shaft and provided at its free end with a bearing, a shaft mounted on the bearing, a rack and a pulley arranged on said shaft, a belt connecting the pulley to the belt-wheel of the main shaft, an arm carried by the lever and engaging the antifriction-roller of the gate, a second pivotally-mounted and counterweighted lever, a revoluble gage supported thereby, an adjustable link connecting the levers, a conveyer-operating shaft, a belt-wheel mounted thereon and having a belting connection with the pulley of the main shaft, a pair of conveyer-shafts, sprocket-wheels mounted thereon, a linked belt extending over the sprocket-wheels and provided with ears extending through a slot in the trough, and pivoted conveyer-bars secured to said ears.

In testimony that I claim the foregoing as my own I have hereto affixed my signature in the presence of two witnesses.

MARTIN J. ELY.

Witnesses:
F. H. THATCHER,
A. GURDMANN.